United States Patent [19]

Mages et al.

[11] Patent Number: 5,937,164
[45] Date of Patent: Aug. 10, 1999

[54] METHOD AND APPARATUS OF SECURE SERVER CONTROL OF LOCAL MEDIA VIA A TRIGGER THROUGH A NETWORK FOR INSTANT LOCAL ACCESS OF ENCRYPTED DATA ON LOCAL MEDIA WITHIN A PLATFORM INDEPENDENT NETWORKING SYSTEM

[75] Inventors: Kenneth G. Mages, Highland Park; Jie Feng, Evanston, both of Ill.

[73] Assignee: HyperLOCK Technologies, Inc., Skokie, Ill.

[21] Appl. No.: 08/792,092

[22] Filed: Jan. 31, 1997

Related U.S. Application Data

[63] Continuation-in-part of application No. 08/756,162, Nov. 25, 1996, which is a continuation-in-part of application No. 08/568,631, Dec. 7, 1995, abandoned.

[51] Int. Cl.$^6$ .............................. H04L 9/32; H04L 9/00; G06F 13/00
[52] U.S. Cl. .............................. 395/200.48; 395/200.48; 395/200.59; 395/200.33; 395/186; 395/187.01; 380/4; 707/9; 707/10
[58] Field of Search ................... 395/200.48, 200.33, 395/200.59, 186, 615, 187.01; 380/4; 707/9, 10

[56] References Cited

U.S. PATENT DOCUMENTS

| | | | |
|---|---|---|---|
| 4,685,055 | 8/1987 | Thomas | 380/4 |
| 5,103,476 | 4/1992 | Waite et al. | 380/4 |
| 5,138,712 | 8/1992 | Corbin | 395/200.59 |
| 5,204,897 | 4/1993 | Wyman | 380/4 |
| 5,222,134 | 6/1993 | Waite et al. | 380/4 |
| 5,260,999 | 11/1993 | Wyman | 380/4 |
| 5,457,746 | 10/1995 | Dolpnin | 380/4 |
| 5,495,411 | 2/1996 | Ananda | 380/4 |
| 5,509,070 | 4/1996 | Schull | 380/4 |
| 5,548,645 | 8/1996 | Ananda | 380/4 |
| 5,592,511 | 1/1997 | Schoen et al. | 348/7 |
| 5,638,513 | 6/1997 | Ananda | 395/187.01 |
| 5,699,512 | 12/1997 | Moriyasu et al. | 395/186 |
| 5,715,453 | 2/1998 | Stewart | 395/200.59 |
| 5,745,642 | 4/1998 | Ahn | 395/615 |
| 5,765,152 | 6/1998 | Erikson | 707/1 |
| 5,790,664 | 2/1999 | Coley et al. | 380/4 |

*Primary Examiner*—Parshotam S. Lall
*Assistant Examiner*—William D. Thomson
*Attorney, Agent, or Firm*—Hamman & Benn

[57] ABSTRACT

A method of triggering video imaging and/or audio data on a "HyperCD" (CD-ROM) via a trigger through a network for instant local access of encrypted data on local media. The CD-ROM contains video/audio files that have been crippled by removing the critical information thereof. The CD-ROM also contains programs for directly and automatically connecting the end-user's computer to a targeted server (URL) a network (such as the Internet). The method of the invention includes the separation of critical information/key from media data, the storage of encrypted keys on a remote server, the storage of crippled chunky media data on CD-ROM's, the socket-to-socket connection between the end-user's computer and the remote server and the request from user to server, the authorization and transmission of the uncrippling key through a network to the end-user's computers, the combining in RAM of the trigger and the crippled data from CD-ROM for instant rendering/playback, the storing of the uncrippling key on the end-user's computers non-volatile media for owning the data on the CD-ROM for later access authorized by the remote server. Since the uncrippling trigger is much smaller than the entire media file, it saves considerable amount of transmission time, thereby instantly combining the trigger with the crippled data on the CD-ROM, after which instantly playing the designated track from end-user's computer.

16 Claims, 9 Drawing Sheets

Microfiche Appendix Included
(1 Microfiche, 44 Pages)

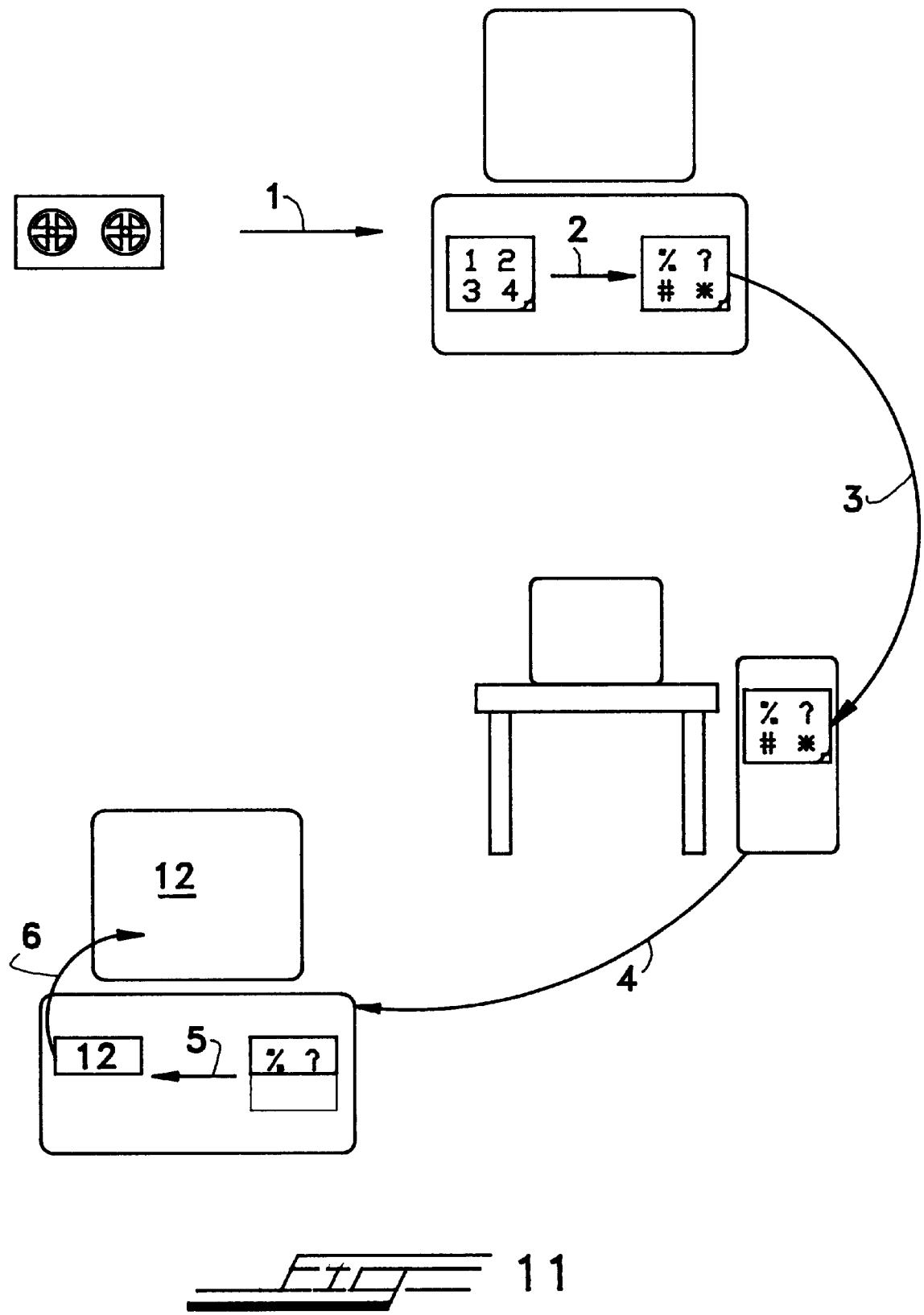

METHOD AND APPARATUS OF SECURE SERVER CONTROL OF LOCAL MEDIA VIA A TRIGGER THROUGH A NETWORK FOR INSTANT LOCAL ACCESS OF ENCRYPTED DATA ON LOCAL MEDIA WITHIN A PLATFORM INDEPENDENT NETWORKING SYSTEM

CROSS REFERENCE TO RELATED APPLICATION

The present application is a continuation-in-part of application Ser. No. 08/756,162, filed on Nov. 25, 1996, which is a CIP of Ser. No. 08/568,631, filed Dec. 7, 1995, now abandoned.

A portion of the disclosure of this patent document contains material which is subject to copyright protection. The copyright owner has no objection to facsimile reproduction by anyone of the patent document or the patent disclosure, as it appears in the Patent & Trademark Office patent file or records, but otherwise reserves all copyright rights whatsoever.

REFERENCE TO MICROFICHE APPENDIX

Reference is had to a Microfiche appendix containing a total of one Microfiche and a total of 44 frames, listing computer programs referred to in the specification.

BACKGROUND OF THE INVENTION

The present invention is directed to a method of transmitting "triggering data" over a network to cause video and/or audio information data on a CD-ROM at an end-user's computer to be made readable. In addition, the CD-ROM comprises program files for automatically dialing and connecting the end-user's computer to a targeted host's server using an operating system such as "Windows 95". The CD-ROM will only allow the end-user access to the video/and or audio on it by logging onto the host's server via a network such as the Internet.

The Internet is a conglomeration of computer networks that are linked together. Each network of the Internet may have one or more servers, and an operating system that may be different from that of others in the Internet. To link one network to another, and in order to overcome these operating differences between computer networks, the Internet system utilizes hardware and software devices called: bridges, routers, and gateways, all of which adapt the information being sent on one network to the operating and protocol requirements of the receiving network. For example, a gateway will connect, or "splice" a network operating on the Novell protocol to a network that operates on a DECnet or SNA protocol.

There are currently more than 10,000 computer networks that are linked together, worldwide, which together constitute the "Internet". Because they do not all operate on the same operating system, and because of different protocols, the data sent from one host computer of one network to a receiving computer of another network—which may be many thousands of miles away from the host computer—may take a relatively long time, since the gateways, bridges and routers must conform or adapt the protocol of the sending host computer to the receiving computer's protocol.

In addition to the time-delays associated with protocol variances, the Internet when connecting to an end-user via Plain Old Telephone Service (POTS), has a maximum data-transmission capacity of 3.6 kbytes per second, which is not enough for sending video images in real time.

The Internet system utilizes two types of file-transfer protocols (FTP) for copying a file from a host computer to the receiving computer: ASCII and binary. An ASCII file is a text file, while every other kind of file is binary. ASCII files are transmitted in seven-digit ASCII codes, while the binary files are transmitted in binary code. Because all data stored in computer memory is stored in binary format, when one sends a file in the Internet, it is sent in binary format. However, as discussed above, owing to the data-transmission constraints imposed by the Internet system because of the differing operating systems, and a multitude of gateways, routers, and bridges, the file data must be sent out in packets of a size no greater than 1536 bytes. Since the size of just a thirty-second video may be as great as 2.5 megabytes, it may take up to one-half hour or more to send a thirty-second video over the Internet from a host computer to a receiving computer. Presently, there are compression techniques that compress the files in order to reduce this playback-time, which data is decompressed at the receiving computer. An example of such a system is VDOLive, manufactured by VDOnet Corp. of Santa Clara, Calif. However, these compression-systems still send the data in binary format, requiring packet-data sizes of no greater than 1536 bytes. Thus, even with these compression-systems, the length of time to receive a thirty-second video over the Internet after being buffered in the user's computer is near real time, but is unstable, choppy and drops as much as 96% of the video data over a conventional phone line.

In the Internet, there is an electronic-mail delivery system called E-mail. The E-mail system utilizes addresses to direct a message to the recipient, with each address having a mailbox code and a daemon, with the mail box and daemon being separated by the symbol @. In the E-mail delivery system, all of the messages or "mail" are routed through selected routers and gateways, until it reaches what may be called a "post office" that services the recipient to whom the electronic mail is to be delivered. The "post office" is a local server. The need for these local "post offices" is because there is every reason to assume that the recipient-computer, to which the mail is being sent, is either not powered up, or is performing a different task. Since most computers in the Internet are not multi-tasking machines, such as, for example, computers running on the DOS operating system, if such a computer be engaged in performing a task, it is not possible for it to receive the E-mail data at that time. Thus, the local "post office" or server stores the message until such a time as it may be delivered to the end-user to whom it is intended.

In the E-mail system, there has really been only one format standard for Internet messages. A variation has been the MIME version, which stands for Multipurpose Internet Mail Extensions, which defines a new header-field, which is intended for use to send non-text messages, such as multi-media messages that might include audio or images, by encoding the binary into seven-digit ASCII code. Before MIME, the limitation of E-mail systems was the fact that it would limit the contents of electronic mail messages to relatively short lines of seven-bit ASCII. This has forced users to convert any non-textual data that they may wish to send into seven-bit bytes representable as printable ASCII characters before invoking a local mail UA (User Agent, a program with which human users send and receive mail). Examples of such encodings currently used in the Internet include pure hexadecimal, uuencoded, the 3-in-4 base 64 scheme specified in RFC 1421, the Andrew Toolkit Representation [ATK], and many others. Even though a user's UA may not have the capability of dealing with the non-textual body part, the user might have some mechanism external to the UA that can extract useful information from the body part. Moreover, it does not allow for the fact that the message may eventually be gatewayed back into an X.400 message handling system (i.e., the X.400 message is "tunneled" through Internet mail), where the non-textual information would definitely become useful again. With MIME, video and/or audio data may be sent using the E-mail system. MIME uses a number of header-fields, such as "Content-Type" header field, which can be used to specify the type and subtype of data in the body of a message and to fully specify the native representation (encoding) of such data; "text" Content-Type value header field, which an be used to represent textual information in a number of character sets and formatted text description languages in a standardized manner; "multi-part" Content-Type value, which can be used to combine several body parts, possibly of differing types of data, into a single message; "application" Content-Type value, which an be used to transmit application data or binary data, and hence, among other users, to implement an electronic mail file transfer service; "message" Content-Type value, for encapsulating another mail message; "image" Content-Type value, for transmitting still image (picture) data; "audio" Content-Type value, for transmitting audio or voice data; "video" Content-Type value, for transmitting video or moving image data, possibly with audio as part of the composite video data format; "Content-Transfer-Encoding" header field, which can be used to specify an auxiliary encoding that was applied to the data in order to allow it to pass through mail transport mechanisms which may have data or character set limitations. Two additional header fields may be used to further describe the data in a message body: The "Content-ID" and "Content Description" header fields.

However, there are considerable drawbacks and deficiencies in transmitting video images and/or audio data over the Internet using E-mail's MIME. Firstly, there is often considerable time delays, such that it may take up to ten or more minutes to send a thirty-second video clip over the E-mail system. In times of high-traffic usage, the delay may even be more than ten minutes. Secondly, the video image or audio data cannot be viewed or listened to by the end-user, or recipient, until all of the data of the entire video or audio file has been received by the receiving computer, which, also, adds a considerable time lag to the actual viewing or listening. Thirdly, the end-user or recipient computer must have the necessary E-mail and MIME software for decoding the data. Fourthly, since MIME is an E-mail protocol system, the data is transmitted via the E-mail system, meaning that it is routed through one or more post offices and servers, which delay the transmission of the data, and which require that no other task be performed by the receiving computer if it is a single-tasking machine, like DOS-operating system machines. Fifthly, like all E-mail deliveries, the requisite E-mail software at the recipient computer must decode the encoded data received, and then cut-and-paste the data into a new file, such as NOTEPAD, which is time-consuming, before the new file is played back by a viewer or player.

SUMMARY OF THE INVENTION

It is the primary objective of the present invention to separate keys and data by providing a CD-ROM having its informational data of video and/or audio that is crippled, which data may only be read after it has been "uncrippled" by receiving "uncrippling" triggering data over the Internet from a server of a host system, so that a company's host computer serving the Internet may transmit the "uncrippling" data over the Internet to an end-user's receiving computer in order to uncripple and, thereby, actuate the CD-ROM, so that the data thereon may be read by the end-user's receiving computer only in volatile memory such as RAM.

It is another objective of the present invention to enable server control of the local media data by providing such a "crippled" CD-ROM with video and/or audio data thereon, whereby content by a company on the Internet may be better controlled, and whereby in conjunction with the content, video and/or audio playback may be combined with any updated, textual information, such as current price of a product or products, location of a store or stores in the vicinity of the end-user's residence, etc. Specific tracks on the CD-ROM can thereby be controlled by the remote server.

It is another objective of the present invention to provide such a "crippled" CD-ROM with video and/or audio data thereon, whereby the CD-ROM is inherently provided with Internet start-up and connecting program that automatically and directly connects the end-user's computer to the company's or content provider's host server via the Internet, whereby, not only does such facilitate and encourage the connection of the end-user to the content provider's web page, but also provides the content provider with valuable marketing information, such as the physical location of the caller, whereby selected information unique to that caller may be downloaded to him over the Internet, such as name and addresses of stores of the company or advertiser nearest to the caller, etc.

It is another objective of the present invention to provide such video imaging, with or without audio, such that the use of the E-mail system or the Internet system itself is entirely obviated.

It is another objective of the present invention to provide such video imaging, with or without audio, such that the data representing the video and/or audio is accessed off the end-user's CD-ROM, with the transmitted de-crippling triggering data from the content provider's host server (URL) being a trigger as small as a few bytes.

It is another objective of the present invention to allow by server permission only, the end-user the ability to store said trigger on non-volatile media for permanent ownerships of said data.

It is also an objective of the invention to provide a software program in the end-user computer called a "catcher" for catching the trigger data such as the file header, decoding it, and playing the file header data substantially "on the fly", so that the video and/or audio data on the CD-ROM may be played back on the end-user's computer substantially immediately after having received the trigger data.

Toward these and other ends, the method of the invention for transmitting the de-crippling triggering data for video and/or audio off a CD-ROM ("HyperCD") over the Internet consists of encoding the data representing critical information of the file keys such as the header of the video/audio files on the CD-ROM, and transmitting that encoded key to the local server of the local web of the Internet serving the caller, or end-user computer. The local server then establishes a point-to-point socket-connection between the transmitting, host computer, and the receiving or end-user computer, thereby obviating the need to send the actual video data over the Internet. When the encoded key is received by the receiving, or end-user, computer, the data is decoded and matched to the video/audio files of the CD-ROM, whereupon, since the data files on the CD-ROM now have an associated and complete header, the data thereof may be read, to thus allow the instant playback of the video-audio data on the CD-ROM.

Since the encoded header data that is sent over the Internet is a necessity before the end-user may playback the video/audio data from the CD-ROM, the host computer may send along with the encoded data, additional information pertinent to the information contained on the CD-ROM, such as current prices, special offers or deals, locations of local stores or dealers, or any information that the host computer, content provider, would like the end-user to receive.

In order to encourage the end-user to view the video/audio, the CD-ROM is provided with its own Internet dial-up program files for connecting to the host web server, so that very little time and effort is required on the part of the end-user.

BRIEF DESCRIPTION OF THE DRAWINGS

The invention will be more readily understood with reference to the accompanying drawings, wherein:

FIG. 11 is a block diagram of the catcher-program process.

DETAILED DESCRIPTION OF THE INVENTION

Figure 1:
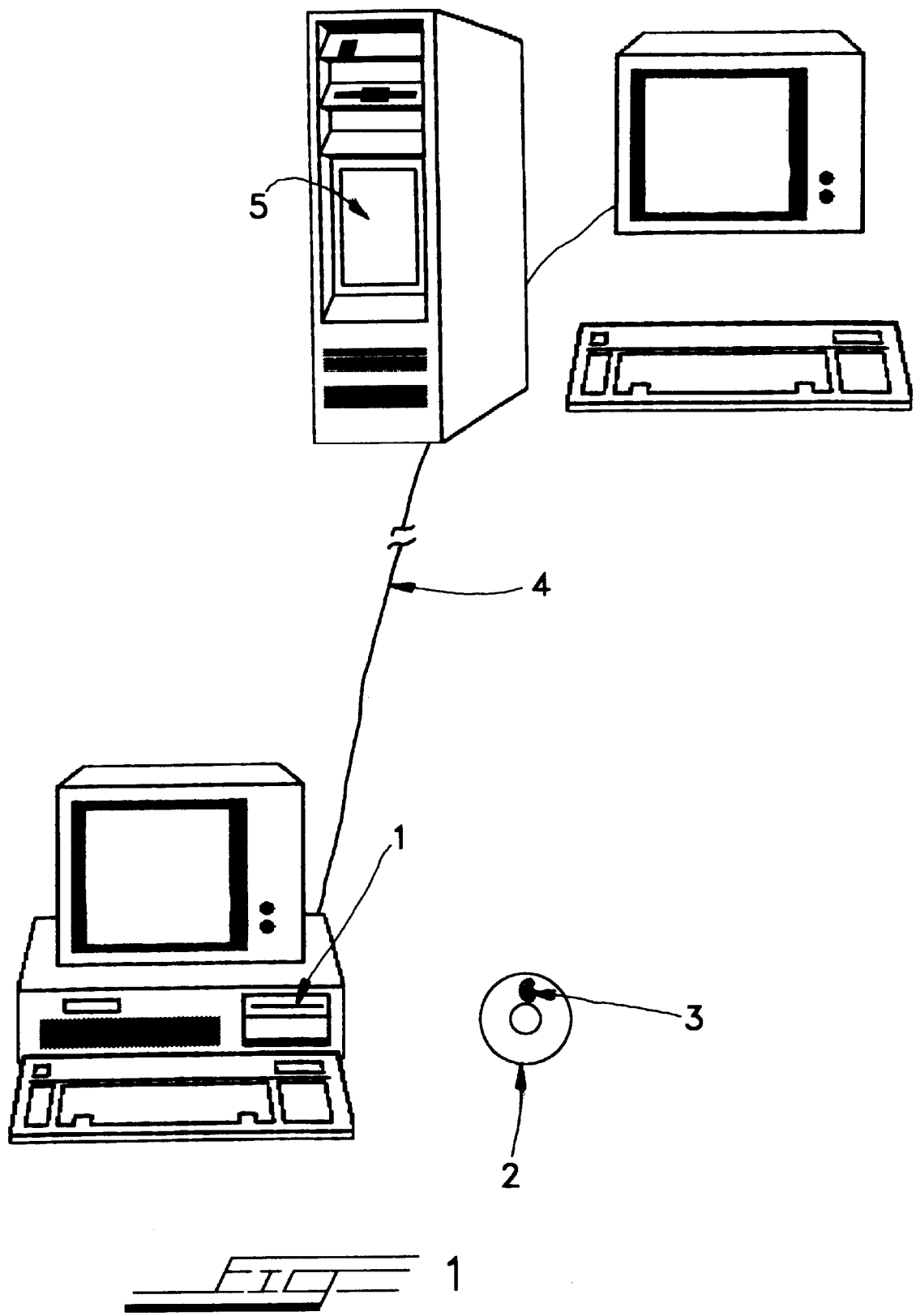
FIG. 1 is a pictorial representations of the hardware systems and software processes used for carrying out the present invention.
Figure 2:
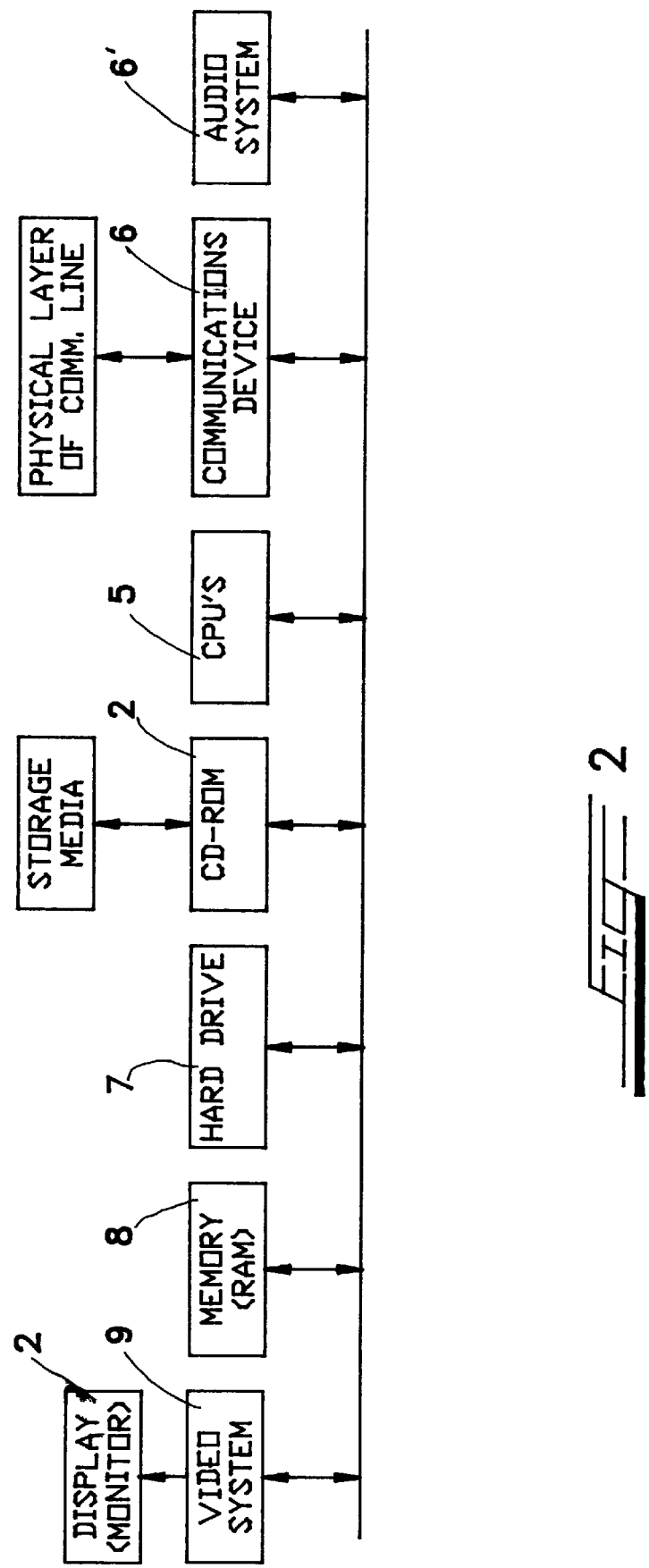
FIG. 2 is a block diagram showing the hardware of the end-user's computer used for carrying out the present invention.

Referring now to the drawings in greater detail, and to FIGS. 1 and 2 for now, the hardware used to carry out the present invention is shown. All of the hardware is conventional and well-known, and includes an end-user computer 1 having a CD-ROM drive 2 for playing a CD-ROM 3 having stored thereon crippled data 4 that is unreadable without first having received a trigger or uncrippling key 5. The end-user's computer 1 is connected via the Internet 6 to a host-computer server 7 which has stored thereat the uncrippling or triggering key 5 for the information stored on the end-user's CD-ROM 3. The end-user's computer 1 has a display and a CPU 9 and a communication-device, such as a modem 10 for establishing communication with the Internet 6. The computer 1 also has the CD-ROM drive 2, hard-drive 11, RAM 13, and video system 8 including monitor as well as audio system 13.

Figure 3:
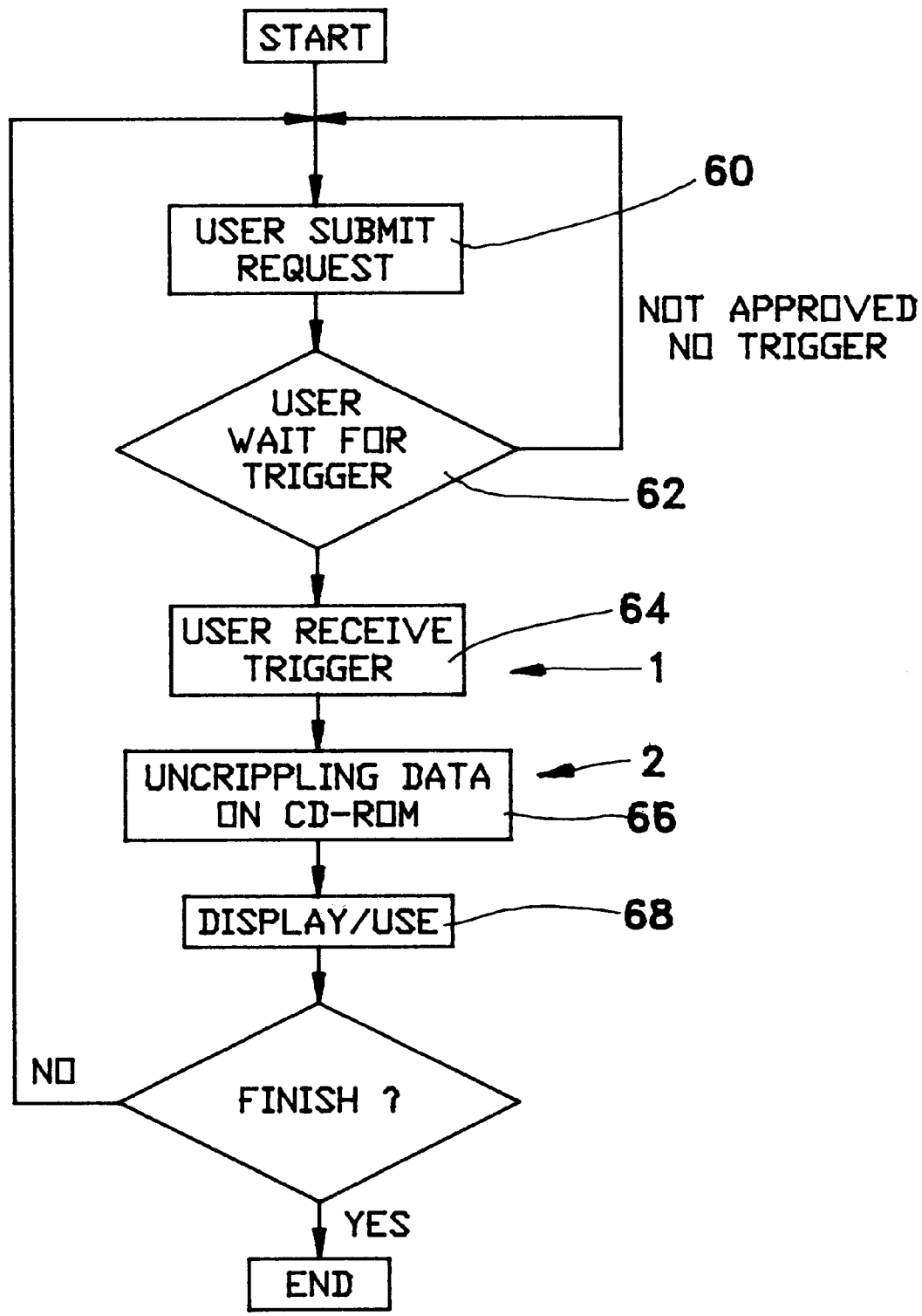
FIG. 3 is a flow chart at a user's computer for accessing the trigger-data from a web-site.

Referring to FIG. 3, there is shown the flow charts for receiving the uncrippling key. The end-user first submits a request over the Internet for the uncrippling key (block 60). The user then waits for that key (block 62), and if the user is not authorized, the request is denied. If the request is authorized, then the uncrippling key is sent by the server and received by the end-user's computer (block 64), whereupon the end-user's computer directs the uncrippling key into volatile memory such as RAM, not into a RAM-disk to be visible, but saved in a dynamically allocated data structure in RAM accessible only by the receiving program, combined with crippled data read from the CD-ROM and displays the video/animation (block 68).

Figure 4:
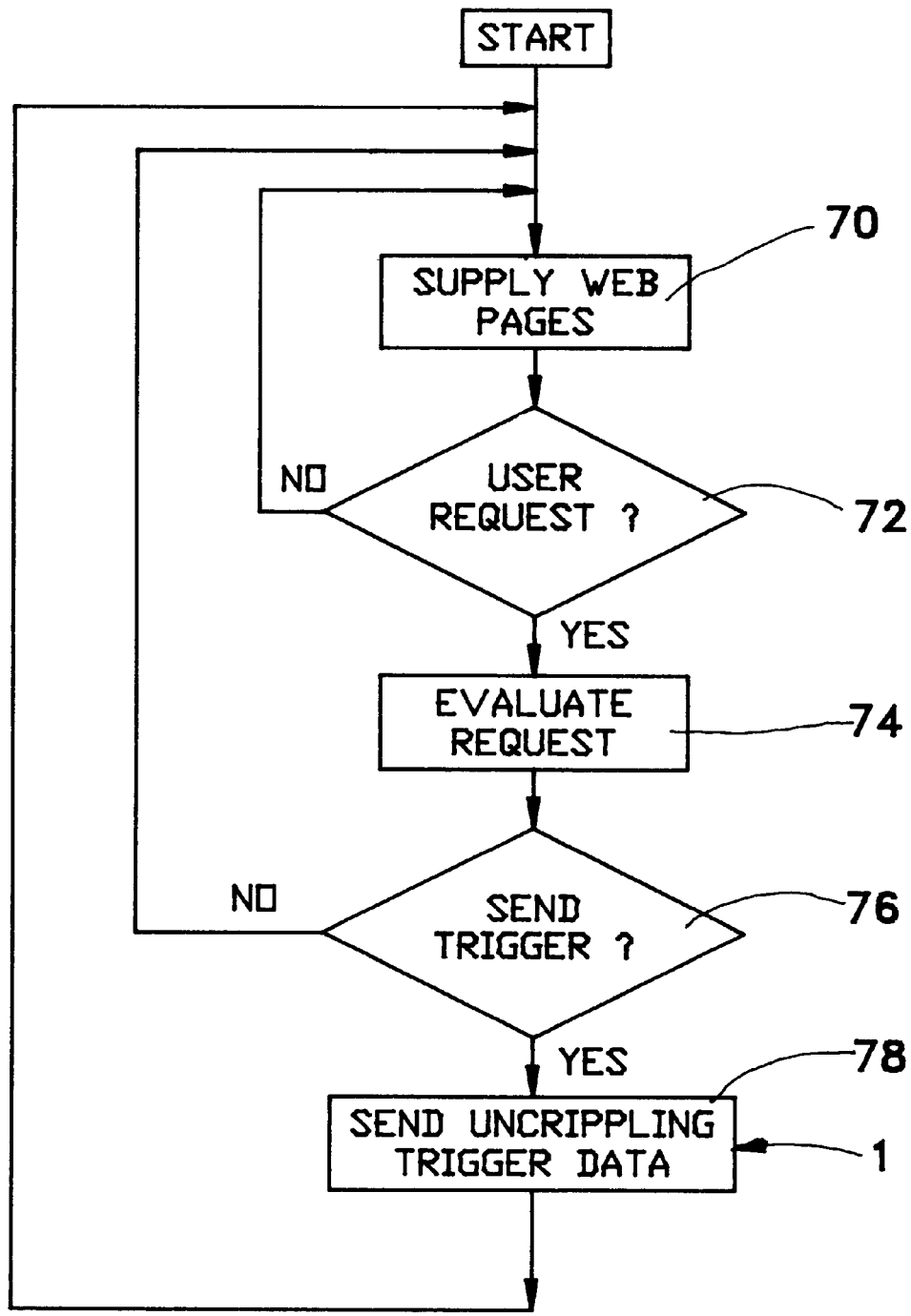
FIG. 4 is a flow chart for the server associated with the Internet for evaluating the trigger-request from the user's computer and for sending the trigger.

FIG. 4 shows the process-flow that at the server side. The server conventionally provides the web pages to the Internet users (block 70), and awaits a user-request (block 72). If a request is received from an end-user's computer, the server evaluates the request (block 74) in order to authorize the transfer of the uncrippling key (block 76). If an authorization is granted, then the uncrippling, trigger key is sent (block 78).

Figure 5:
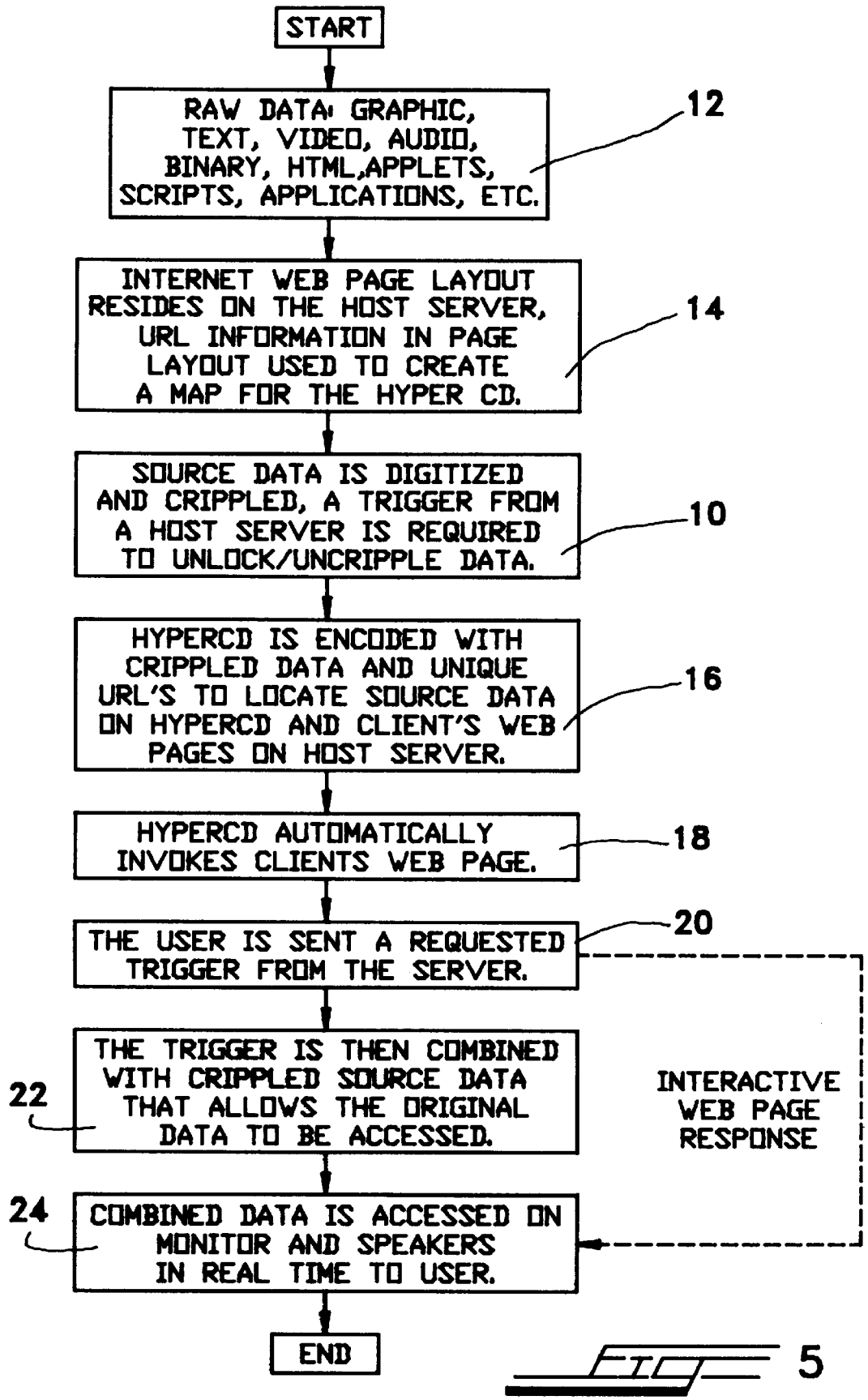
FIG. 5 is a block diagram showing the socket-to-socket connection for transmitting the de-crippling, triggering key for causing the display of the video images and/or audio data of a "HyperCD" at the end-user's PC over the Internet from a host computer combined with a targeted URL to a recipient or end-user's computer.
Figure 6:
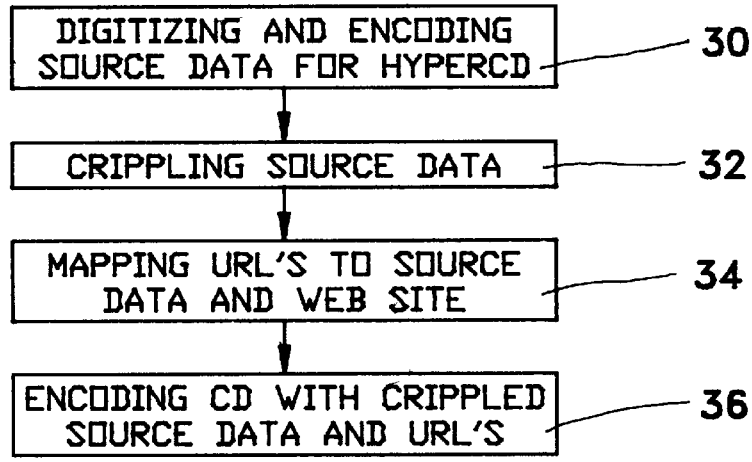
FIG. 6 is a block diagram showing the steps for forming on the CD-ROM the encoded video and audio data for use by the end-user recipient computer after having been crippled by removing the header-triggering key sent from the media files.
Figure 7:
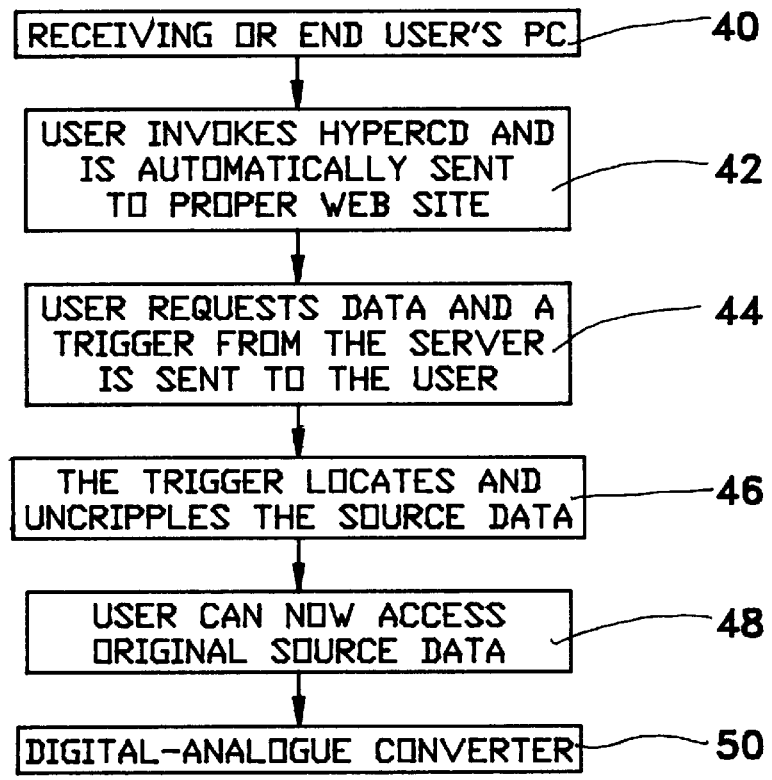
FIG. 7 is a block diagram showing the process of triggering in order to invoke "HyperCD" video and/or audio data at the receiving computer for playback.

Referring now to FIGS. 5–7, video images and/or audio are converted from analogue to digital and stored in crippled fashion in digitized format (block 10) on CD-ROM 3. The crippling of the CD-ROM is achieved by removing critical information such as the video-audio header, whereupon such video/audio data is rendered unreadable by the end-user's computer. The "HyperCD" 3 is provided with the URL (web page) of the designated host computer, or server, (block 14), such, as for example: http://tekweb.com/hypercd/adver/lotto.html, which may be used on the CD-ROM for the Illinois Instant Lottery video advertising. Such digitized format may be existing computer memory files (block 12) that are already in binary format, or may be original files originated by recording the video and/or audio, as by a camcorder or tape, etc., and converting the analogue signals into digital, or binary, code. In the case of originating files, the analogue data may be converted to digital data using an INTEL "Smart Video Reorder Pro", for example. The raw binary data that is stored on the "HyperCD" (block 16) is crippled, so the only way to access the data is a socket-to-socket connection with the server of the web page of the host. By means of the process performed in block 14, the CD-ROM contains a code representing the URL web page of the host computer where the necessary de-crippling key is located. This data on the CD-ROM 3 will automatically call up and connect the end-user's computer to the host computer's server 7 on the Internet, whereby a socket-to-socket connection is made therebetween (block 18). Such an automatic connection is well-known, and will automatically find the end-user's browser, will call the Internet service provider, and pass the necessary links from the CD-ROM to the browser in order to get to the host's web page. Such software is available on the "Windows 95" operating system, such as "ActiveX". The host computer then sends back to the local server serving the end-user's computer the necessary, decrippling trigger for the specific video/audio data on the end-user's CD-ROM (block 20). From the local server, the data is sent out directly over the Internet to the end-user, and, in particular, to the RAM 12 of the end-user's computer (block 22). In RAM, the trigger (block 22), and the data on the CD-ROM 3 are combined, and played back (block 24), as described above. However, as will be explained hereinbelow, since the key 5 is being sent via Internet 6, the end-user's computer 7 must be equipped with the requisite software which is capable of receiving data from the server 7 and which will ensure that the received encoded key 5 is placed safely in RAM 12, and not allowed to be otherwise saved in hard drive 11 where it may be captured and used in a way not authorized by the server 7.

Referring to FIG. 6, at the end-user computer end, the raw analogue data of the audio/video is digitized (block 30), as explained above, and stored on CD-ROM 3 by conventional techniques. During the storage of the data on the key or critical information of the media file such as video-audio header associated with the video/audio files will be omitted from storage on the CD-ROM, whereupon the CD-ROM is crippled, or prevented from being read for playing back the video/audio files (block 32). The CD-ROM is provided with software for linking the host-computer which has the necessary key 5 for uncrippling the video-audio files 4 on the CD-ROM 3, which linking software maps or automatically directs the end-user's computer to the host server via the Internet, such linking software having all of the necessary routing information for directing the Internet connection to the host computer's server and web page (URL) (Block 34). The encoding of the critical information such as "Header" trigger is achieved utilizing any conventional encoding program, such as, for example, RSA by Data Security (block 36). This encoding will create a trigger of a few bytes comprising all of the necessary information to trigger the CD-ROM, and to invoke the video and/or audio data.

Figure 8:
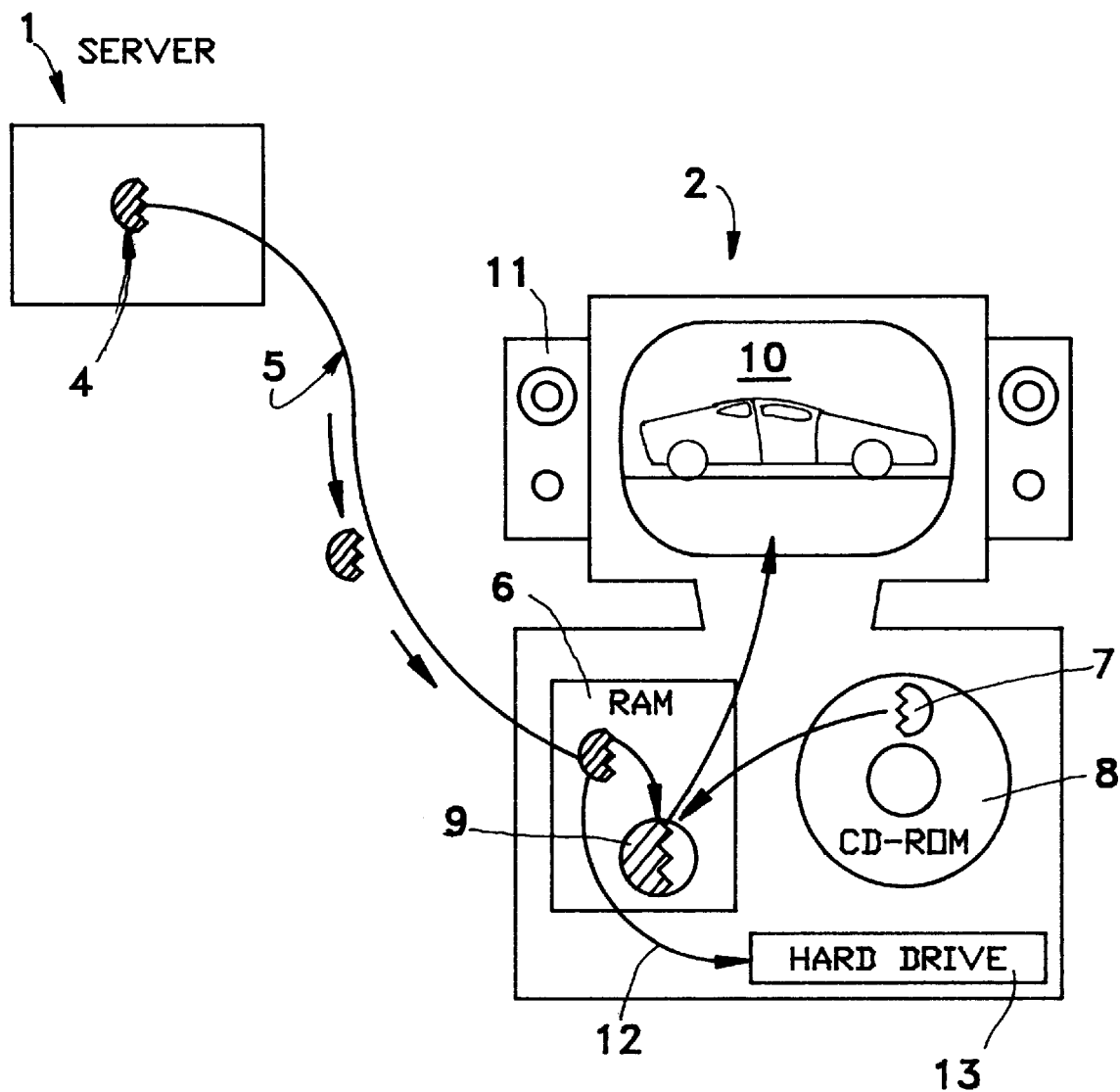
FIG. 8 is a pictorial representation of the hardware component and software processing involved.

FIG. 7 shows the steps involved for de-crippling the data on the CD-ROM 3 of a receiving or end-user's computer 1 (block 40). A socket-to-socket connection is made between the host, or sending, computer and the receiving, or end-user's computer by means of the linking software described above installed on the end-user's computer (block 42). The Internet Service Provider (ISP) of the end-user's computer's web of the Internet sends the data to the host computer's server over the Internet, which means that any number of local servers and gateways and routers will have been involved in transmitting the data, until it finally arrives at the server 7 serving the web associated with the host computer (block 42). As soon as this socket-to-socket connection is made, the encoded trigger 5 is sent, at a rate of about 3.6 kbytes a second (block 44). The end-user's computer has a specially-dedicated software program for catching the key, decrypting the key 5 from the server and data from the CD-ROM 3, combining the key and data and playing it back. This catcher is a software program discussed hereinbelow that will direct the incoming key, scuh as the header, to a random location in RAM 8 such as cache directroy, of the computer (block 46) and the key will only be visible to the program. The catcher is necessary, since, if it were not present, it is the "nature" of personal computers to randomly dump data which has not had a specific destination assigned to it. Thus, without the catcher, the incoming data may be strewn into a different directory and/or sub-directories, to, thus, be irretrievably lost. As soon as the encoded key 5 arrives and is stored in RAM by means of the catcher program, a subroutine "player" in the program in the receiving computer begins to decode the trigger, in order to invoke the correct track of the CD-ROM (block 48), from which the data passes to the audio/video subsystem (8,13, FIG. 2), in order to play the video or audio (block 50). It is noted, and emphasized, that as soon as the key has been decoded, the video and/or audio data is immediately "played" back by the audio/video subsystems (8,13, FIG. 2), bypassing the necessity of having to first store the key, or other trigger, on a hard drive before playback. Referring specifically to FIG. 8, there are shown the server 1, the user computer 2, and the software processes 3 used for transmitting the uncrippling key 4 over a network 5, the combining in RAM 6 of the key 4 and crippled data 7 from the CD-ROM 8, the rendering or displaying of the media data 9 such as video/audio or animation on the display 10 or from the audio system 11, and the storing of the key 4 to non-volatile media 13, such as a hard drive, for permanent ownership of the encrypted CD media.

It is noted that it is possible to "cripple" the video/audio data on the CD-ROM by other means other than deleting the header thereof. For example, the file could be made a hidden file, with the trigger data from the host computer being a command to remove the hidden status. Alternatively, the video/audio file could have a changed extension, with the trigger data from the host computer being a command to change the extension. Moreover, the crippling of the video/audio file may be achieved by the use of ZIP file, with the trigger data from the host computer being a command to UNZIP the data. It is, also, within the scope and purview of the invention to use a floppy disk for storing the crippled file, as described above, for those applications requiring less disk-memory, with the uncrippling data from the host server being sent to the floppy-disk drive via the catcher program, as described above for uncrippling the data on the floppy-disk. Of course, the crippled file may also be stored on any storage medium, such as the hard drive 11, with the uncrippling data from the host server being sent to the drive for that storage medium via the catcher program, as explained above. The uncrippling data may also be stored directly in a hard drive or EPROM so that the user has permanent access to it whenever he wishes to uncripple the file; that is, if the user wishes to permanently retain the crippled nature of the data on the CD-ROM, or floppy, he may permanently store the downloaded uncrippling data in hard drive in order to temporarily uncripple the data on the CD-ROM or floppy every time that it is used, as long as such access is authorized by the server.

Figure 9:
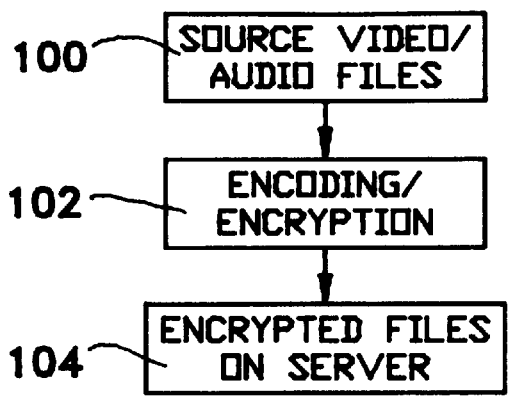
FIG. 9 is a flow chart showing the server-side of the Internet with the encrypted files thereat.
Figure 10:
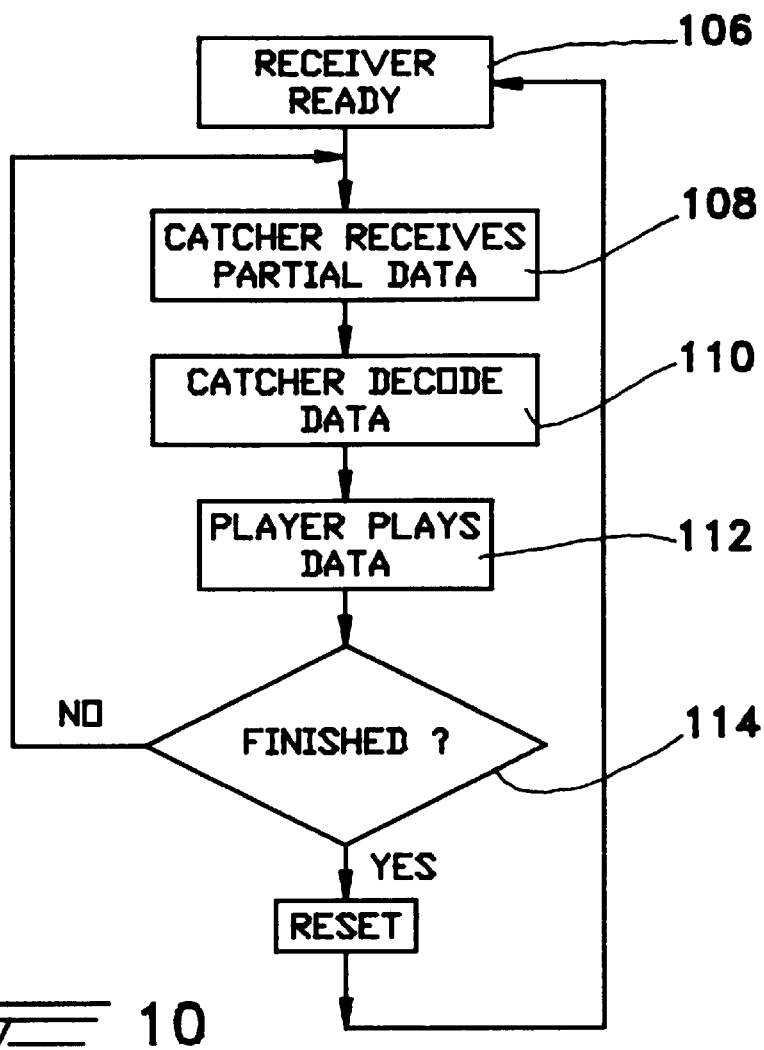
FIG. 10 is a flow chart showing the "catcher" program of the invention at the end-user's computer for playing back the receiving data immediately.

Referrng to FIGS. 9–11, the above-discussed "catcher" program is shown. Encrypted files, such as the header for the crippled CD-ROM data at an end-user's computer, is stored at a server associated with the Internet (block 100 in FIG. 9). This header-trigger or other file is encoded and encrypted in a conventional manner at the server (blocks 102, 104). This encoding will create a header of about 50K or less comprising all of the necessary information necessary to the video and/or audio data on the CD-ROM, as is well-known in the art. Then, the encoded data is sent to the local web server (block 36) in order to be sent out over the Internet, and then to the end-user computer. When the end-user computer requests that the trigger be downloaded, according to the process described above (block 106 of FIG. 10), the catcher program at the end-user computer receives the partial data or trigger, such as a header for the CD-ROM file (block 108). The catcher program decodes the data, using a conventional decoder (block 110), and then sends the data directly the conventional player of end-user computer (block 112) for substantially immediate playback. As soon as the encoded header arrives and stored in the cache directory, the program entitled "player" in the receiving computer begins to decode the data, in order to regenerate the original binary code, from which the data passes to a conventional digital-to-analogue converter, in order to play the video or audio. It is noted, and emphasized, that as soon as the header has been decoded, the video and/or audio data starts to play back by the digital-to-analogue converter. That is, it is not necessary to store the trigger data on a hard drive, although it is possible to do so, if it is desired to allow the end-user unobstructed access to the video or audio files on the CD-ROM, or the like, at any time in the future.

The following is the software code listing for the server of the host computer's web for bursting the encoded "header" trigger data through the Internet.

.OJ OFF.PO1
SENDFILE.C

```perl
#!/usr/sbin/perl
# Get the input
read(STDIN, $buffer, $ENV{'CONTENT_LENGTH'});
# Split the name-value pairs
@pairs = split(/&/, $buffer);
foreach $pair (@pairs)
{
            ($name, $value) = split(/=/, $pair);
            # UN-Webify plus signs and %-encoding
            $value =~ tr/+//;
            $value =~ s/%([a-fA-FO-9][a-fA-FO-9])/pack("C",hex($1))/eg;
            $FORM{$name} = $value;
}
# Location of the CMC files
$CMCDIR = '/UL/people/CMC/'. $FORM('dir');
# If the $CMCDIR director is not found, exit
if ( ! -d "$CMCDIR")
{
            &Error("$CMCDIR not found on this system. Please check the path and try
again\n");
}
# If there are no files in the CMC directory no point trying to transfer files
else
{
 opendir( THISDIR, "$CMCDIR" );
 @allfiles = grep(/\.CMC/,readdir(THISDIR));
 if (! @allfiles ) {
            &Error("There are currently no CMC files in this directory. Try again later."); }
 sort @allfiles;
}
print ("HTTP/1.0 200\n");
print ("Content-type: multipart/x-mixed-replace;boundary=—ThisRandomString—\n\n");
print ("—This Random String—\n");
#Send the First file with .IVD extension which invokes IVIDEO.EXE
print "Content-type: application/x-IVD\N\N";
$CONTENT = `cat $CMCDIR/CMC001.IVD`;
print $CONTENT;
print ("\n—ThisRandomString—\n");
# Now send rest of the .CMC files which would call filehd1.exe
while (@allfiles)
{
            $file = shift@allfiles;
            print "Content-type; application/x-CMC\n\n";
            pring "$file\n";
            $CONTENT = `cat $CMCDIR/$file`;
            pring $CONTENT;
            print ("/n—This RandomString—\n");
}
# Subroutine that tells whats wrong
sub Error
{
            print ("Content-type: texxt/htm1\n\n");
            print ("<Title>Error</Title>\n");
            print ("<H1>Error: </H1><p>\n");
            print (@_);
            print ("<p><p><hr><a href=\"mailto:cmcinter\@suba.com\">Contact webmaster </a>");
            exit ();
}
```

COPYRIGHT - 1996 PLANET GRAPHICS, INC.

The following is the software code listing at the host-computer for encoding the "header" binary data into seven-digit ASCII text format, and also listed is the software code listing for the "player", or decoder, at each receiving, or end-user, computer, for decoding the encoded text format back into binary:

.LS1

HOOK_MENU1 MENU LOADONCALL MOVEABLE DISCHARDABLE
{
 POPUP "&File"
 {
  MENUITEM "&Encode . . . ", 1169
  MENUITEM "&Decode . . . ", 1170

```
}
POPUP "&Actions"
{
 MENUITEM "&Concatenate Files . . . ", 1171
 MENUITEM "&View A Report File . . . ", 1172
 MENUITEM "C&lean Directories . . . ", 1173
 MENUITEM SEPARATOR
 MENUITEM "&Display Wincode Task", 1174
 MENUITEM "&Hide Wincode Task", 1175
}
POPUP "&Options"
{
 MENUITEM "&Encode . . . ", 1176
 MENUITEM "&Decode . . . ", 1177
 MENUITEM "&Wincode . . . ", 1178
 MENUITEM "&Winsort . . . ", 1179
 MENUITEM SEPARATOR
 MENUITEM "&Viewer . . . ", 1180
 MENUITEM SEPARATOR
 MENUITEM "&ZIP/UNZIP . . . ", 1181
 MENUITEM SEPARATOR
 MENUITEM "&Hook App . . . ", 1182
}
POPUP "&Help"
{
 MENUITEM "&Contents", 1183
 MENUITEM "&Search for Help on . . . ", 1184
 MENUITEM "&How to Use Help", 1185
 MENUITEM "&Wincode FAQ", 1186
 MENUITEM "C&opyrights", 1187
 MENUITEM SEPARATOR
 MENUITEM "O&rdering the Help file . . . ", 1188
 MENUITEM SEPARATOR
 MENUITEM "&About Wincode . . . ", 1189
}
 MENUITEM SEPARATOR
 MENUITEM "&UnHook Wincode", 1190
 MENUITEM SEPARATOR
 MENUITEM "E&xit Wincode", 1191
}
HOOK_MENU2 MENU LOADONCALL MOVEABLE DISCARDABLE
{
 POPUP "&File"
 {
  MENUITEM "&Encode . . . ", 2269
  MENUITEM "&Decode . . . ", 2270
 }
 POPUP "&Actions"
 {
  MENUITEM "&Concatenate Files . . . ", 2271
  MENUITEM "&View A Report File . . . ", 2272
  MENUITEM "C&lean Directories . . . ", 2273
  MENUITEM SEPARATOR
  MENUITEM "&Display Wincode Task", 2274
  MENUITEM "&Hide Wincode Task", 2275
 }
 POPUP "&Options"
 {
  MENUITEM "&Encode . . . ", 2276
  MENUITEM "&Decode . . . ", 2277
  MENUITEM "&Wincode . . . ", 2278
  MENUITEM "&Winsort . . . ", 2279
  MENUITEM SEPARATOR
  MENUITEM "&Viewer . . . ", 2280
  MENUITEM SEPARATOR
  MENUITEM "&ZIP/UNZIP . . . ", 2281
  MENUITEM SEPARATOR
  MENUITEM "&Hook App . . . ", 2282
 }
 POPUP "&Help"
 {
  MENUITEM "&Contents", 2283
  MENUITEM "&Search for Help on . . . ", 2284
  MENUITEM "&How to Use Help", 2285
  MENUITEM "&Wincode FAQ", 2286
  MENUITEM "C&opyrights", 2287
  MENUITEM SEPARATOR
  MENUITEM "O&rdering the Help file . . . ", 2288
```

```
                                    .LS1
 MENUITEM "&About Wincode . . . ", 2289
}
 MENUITEM SEPARATOR
 MENUITEM "&UnHook Wincode", 2290
 MENUITEM SEPARATOR
 MENUITEM "E&xit Wincode", 2291
}
HOOK_MENU3 MENU LOADONCALL MOVEABLE DISCARDABLE
(
 POPUP "&File"
{
 MENUITEM "&Encode . . . ", 3369
 MENUITEM "&Decode . . . ", 3370
}
 POPUP "&Actions"
{
 MENUITEM "&Concatenate Files . . . ", 3371
 MENUITEM "&View A Report File . . . ", 3372
 MENUITEM "C&lean Directories . . . ", 3373
 MENUITEM SEPARATOR
 MENUITEM "&Display Wincode Task", 3374
 MENUITEM "Hide Wincode Task", 3375
}
 POPUP "&Options"
{
 MENUITEM "&Encode . . . ", 3376
 MENUITEM "&Decode . . . ", 3377
 MENUITEM "&Wincode . . . ", 3378
 MENUITEM "&Winsort . . . ", 3379
 MENUITEM SEPARATOR
 MENUITEM "&Viewer . . . ", 3380
 MENUITEM SEPARATOR
 MENUITEM "&ZIP/UNZIP . . . ", 3381
 MENUITEM SEPARATOR
 MENUITEM "&Hook App . . . ", 3382
}
 POPUP "&Help"
{
 MENUITEM "&Contents", 3383
 MENUITEM "&Search for Help on . . . ", 3384
 MENUITEM "&How to Use Help", 3385
 MENUITEM "&Wincode FAQ", 3386
 MENUITEM "C&opyrights", 3387
 MENUITEM SEPARATOR
 MENUITEM "O&rdering the Help file . . . ", 3388
 MENUITEM SEPARATOR
 MENUITEM "&About Wincode . . . ", 3389
}
 MENUITEM SEPARATOR
 MENUITEM "&UnHook Wincode", 3390
 MENUITEM SEPARATOR
 MENUITEM "E&xit Wincode", 3391
}
HOOK_WORKING DIALOG LOADONCALL MOVEABLE DISCARDABLE 100, 89, 141, 55
STYLE WS_POPUP | WS_VISIBLE | WS_CAPTION
CAPTION "Wincode Working . . . "
FONT 8, "MS Sans Serif"
{
 LTEXT "", 103, 81, 19, 27, 8
 LTEXT "", 102, 81, 9, 27, 8
 PUSHBUTTON "&Stop", 104, 18, 37, 45, 13
 PUSHBUTTON "&Quit", 105, 78, 37, 45, 13
 RTEXT "Total Job:", -1, 12, 19, 66, 8
 CONTROL "", -1, "STATIC", SS_BLACKFRAME | WS_CHILD | WS_VISIBLE, 6, 6, 129, 25
 RTEXT "", 101, 12, 9, 66, 8
}
BASE64_TYPE DIALOG LOADONCALL MOVEABLE DISCARDABLE 71, 26, 123, 181
STYLE DS_MODALFRAME | WS_POPUP | WS_CAPTION | WS_SYSMENU
FONT 8, "MS Sans Serif"
{
 DEFPUSHBUTTON "OK", 1, 12, 163, 45, 13
 RADIOBUTTON "Application: &Octet-Stream:, 301, 12, 19, 99, 12, BS_AUTORADIOBUTTON | WS_TABSTOP
 RADIOBUTTON "Application: &Postscript:, 302, 12, 34, 99, 12, BS_AUTORADIOBUTTON | WS_TABSTOP
 RADIOBUTTON "Image: &JPEG", 303, 12, 49, 99, 12, BS_AUTORADIOBUTTON | WS_TABSTOP
 RADIOBUTTON "Image: &GIF", 304, 12, 64, 99, 12, BS_AUTORADIOBUTTON | WS TABSTOP
 RADIOBUTTON "Image: &X-BMP", 305, 12, 79, 99, 12 BS-AUTORADIOBUTTON | WS_TABSTOP
 RADIOBUTTON "Video: &MPEG", 306, 12, 94, 99, 12, BS_AUTORADIOBUTTON | WS_TABSTOP
 RADIOBUTTON "Audio: X-&WAV", 307, 12, 109, 99, 12, BS_AUTORADIOBUTTON | WS_TABSTOP
```

-continued

.LS1

```
  PUSHBUTTON "Cancel", 2, 66, 163, 45, 13
  GROUPBOX "Content-Type", 101, 6, 5, 111, 152, BS_GROUPBOX | WS_GROUP
}
DESC_TEXT DIALOG LOADONCALL MOVEABLE DISCARDABLE 9, 50, 288, 138
STYLE DS_MODALFRAME | WS_POPUP | WS_CAPTION | WS_SYSMENU'
CAPTION "Descriptive Text will be added to first Encoded file . . . "
FONT 8, "MS Sans Serif"
{
EDITTEXT 201, 6, 6, 276, 108, ES_MULTILINE | ES_AUTOVSCROLL | ES_WANTRETURN
    | WS_BORDER | WS_VSCROLL | WS_TABSTOP
DEFPUSHBUTTON "OK", 1, 69, 120, 60, 13
PUSHBUTTON "Cancel", 2, 159, 120, 60, 13
}
DIR_SELECT DIALOG LOADONCALL MOVEABLE DISCARDABLE 15, 20, 147, 116
STYLE DS_MODALFRAME | WS_OVERLAPPED | WS_CAPTION | WS_SYSMENU
FONT 8, "Helv"
{
EDITTEXT 101, 42, 5, 98, 12, ES_AUTOHSCROLL | WS_BORDER | WS_TABSTOP
DEFPUSHBUTTON "OK", 1, 88, 22, 50, 14
LISTBOX 103, 6, 30, 64, 82, LBS_STANDARD | WS_TABSTOP
PUSHBUTTON "Cancel", 2, 88, 41, 50, 14
LTEXT "D&irectories:", -1, 6, 18, 64 10
LTEXT "&Directory:", -1, 6, 6, 36, 10
}
EXISTS DIALOG LOADONCALL MOVEABLE DISCARDABLE 41, 34, 177, 54
STYLE DS_MODALFRAME | WS_POPUP | WS_CAPTION | WS_SYSMENU
CAPTION "Wincode - Output File"
FONT 8, "MS Sans Serif"
{
PUSHBUTTON "&Overwrite", 1, 9, 36, 45, 13
PUSHBUTTON "&Rename", 101, 66, 36, 45, 13
PUSHBUTTON "&Skip File", 2, 123, 36, 45, 13
CTEXT "", 102, 21, 15, 135, 8
CONTROL "", "STATIC", SS_BLACKFRAME | WS_CHILD | WS_VISIBLE, 15, 6, 147, 21
}
FILE OPEN DIALOG LOADONCALL MOVEABLE DISCARDABLE 40, 20, 202, 130
STYLE DS_MODALFRAME | WS_OVERLAPPED | WS_CAPTION | WS_SYSMENU
FONT 8, "Helv"
{
EDITEXT 100, 42, 6, 98, 12, ES_AUTOHSCROLL | WS_BORDER | WS_TABSTOP
DEFPUSHBUTTON "OK", 1, 146, 5, 50, 14
LISTBOX 102, 6, 44, 64, 82, LBS_STANDARD | WS_TABSTOP
LISTBOX 103, 76, 44, 64, 82, LBS_STANDARD | WS_TABSTOP
PUSHBUTTON "Cancel", 2, 146, 23, 50, 14
LTEXT "File&name:", -1, 6, 8, 36, 10
LTEXT "Directory:", "1, 6, 20, 36, 10
LTEXT "", 101, 42, 20, 98, 10
LTEXT "&Files:", -1, 6, 32, 64, 10
LTEXT "&Directories:", -1, 76, 32, 64, 10
}
RENAME DIALOG LOADONCALL MOVEABLE DISCARDABLE 34, 31, 199, 57
STYLE DS_MODALFRAME | WS_POPUP WS_CAPTION | WS_SYSMENU
FONT 8, "MS Sans Serif"
{
EDITEXT 102, 6, 21, 171, 12 ES_AUTOHSCROLL | WS_BORDER | WS_TABSTOP
PUSHBUTTON "?", 103, 180, 20, 12, 13
DEFPUSHBUTTON "OK", 1, 42, 39, 45, 13
PUSHBUTTON "Cancel", 2, 111, 39, 45, 13
LTEXT "Enter a VALID DOS filename:", 104, 6, 6, 159, 9
}
VIEW_RPT DIALOG LOADONCALL MOVEABLE DISCARDABLE 20, 43, 300, 154
STYLE DS-MODALFRAME | WS_POPUP | WS_CAPTION | WS_SYSMENU
CAPTION "Wincode - Report File Viewer"
FONT 8, "MS Sans Serif"
{
DEFPUSHBUTTON "OK", 2, 111, 135, 78, 13
EDITTEXT 101, 6, 15, 288, 99, ES_MULTILINE | ES_READONLY | WS_BORDER | WS_VSCROLL | WS_HSCROLL | WS_TABSTOP
CHECKBOX "&Delete Report File After Viewing", 103, 6, 117, 138, 12, BS-AUTOCHECKBOX | WS_TABSTOP
LTEXT "File:", -1, 7, 5, 15, 8
LTEXT"", 102, 25, 5, 270, 8
}
                    COPYRIGHT - 1996 PLANET GRAPHICS, INC.
```

First and second software code listings for each receiving, or end-user, computer, for the catcher for receiving the uncrippling data in the cache directory of RAM and directing it to the proper drive, are shown in the Microfiche appendix, which Microfiche appendix forms a part of the specification.

What I claim is:

1. A method of transmitting data invoking a crippled file on a storage medium containing video and/or audio over a network, comprising:
   (a) converting analog video and/or audio data into digital data;
   (b) crippling the video and/or audio files on the storage medium, whereupon the files are rendered unusable without an uncrippling trigger;
   (c) storing the digital data representing the video and/or audio on a storage medium for use by an end user's computer means;
   (d) storing uncrippling trigger data comprising selected information at a host computer means which is independent of platform for use in uncrippling the data files on the storage medium;
   (e) transmitting the uncrippling trigger data from the host computer means through a network to the end-user's computer means with which the storage medium having the crippled data files thereon is associated;
   (f) receiving the uncrippling trigger data at the end-user's computer means in the volatile RAM of the end-user's computer means; and
   (g) substantially instantly uncrippling the crippled data files on the storage medium by means of combining in RAM the uncrippling trigger data sent by the host computer means in said step (e) with the crippled data on the storage medium; and
   step (g) being carried out immediately after said step (f), and, immediately after said step (g), playing the video and/or audio on a player means;
   said step (f) comprising:
     1) directing the incoming uncrippling trigger data to RAM for temporary storage therein;
     2) combining in RAM said uncrippling trigger data with said crippled video and/or audio files; and
     3) said step (g) being performed while said uncrippling data is in said RAM for immediate playback of said video and/or audio files on said storage medium.

2. The method of transmitting data invoking a crippled file on a storage medium containing video and/or audio over the Internet, according to claim 1, wherein said step (f) comprises catching the uncrippling trigger data for the crippled data files, and directing the encoded trigger data to a specific cache directory of the end-user computer means.

3. The method of transmitting data invoking a crippled file on a storage medium containing video and/or audio over the Internet, according to claim 1, wherein said step (c) comprises removing the header data from the video/audio files; said step (d) comprising storing the header data representing the header data removed from the video/audio files in said step (c).

4. The method of transmitting data invoking a crippled file on a storage medium containing video and/or audio over the Internet, according to claim 1, said step of playing comprising converting the digital binary data back into analogue.

5. The method of transmitting data invoking a crippled file on a storage medium containing video and/or audio over the Internet, according to claim 1, wherein said storage medium comprises memory means for representing the necessary information for automatically and directly connecting via the Internet the end-user's computer, with which the storage medium is associated, to a host computer which stores the uncrippling trigger data for the video/audio files on the storage medium.

6. The method of transmitting data invoking a crippled file on a storage medium containing video and/or audio over the Internet, according to claim 1, further comprising:

(h) allowing, by server-permission only, the end-user the ability to store said trigger on non-volatile media for permanent ownership of said data.

7. A method of transmitting data invoking a crippled file on a storage medium containing video and/or audio data over the Internet, comprising:
   (a) storing uncrippling trigger data which is independent of platform at a host computer for use in uncrippling video/audio files on a storage medium;
   (b) transmitting the uncrippling trigger data from the host computer through the Internet to the end-user's computer with which the storage medium having the crippled files thereon is associated;
   (c) receiving the uncrippling trigger data at the end-user's computer over the Internet;
   (d) immediately after said step (c), uncrippling the crippled data files on the storage medium by means of the uncrippling trigger data sent by the host computer in said step (b);
   (e) immediately after said step (d), playing the video and/or audio on a player;
   said step (c) comprising directing the incoming uncrippling trigger data to volatile RAM for temporary storage therein, combining in RAM said trigger data with said crippled file, and preventing the copying thereof to nonvolatile memory; said step (d) being performed while said uncrippling data is in said volatile RAM for immediate playback of said video and/or audio files by said step (e).

8. The method of transmitting data invoking a crippled file on a storage medium containing video and/or audio data over the Internet, according to claim 7, wherein said step (c) comprises catching the uncrippling trigger data for the crippled data files and retrieving the data to a specific cache-directory location of the end-user computer from the remote server into the end-user's RAM for immediate playback by said step (e).

9. The method of transmitting data invoking a crippled file on a storage medium containing video and/or audio data over the Internet, according to claim 7, wherein before said step (a), removing the header data from the video/audio files; said step (d) comprising restoring the header data representing the header data removed from the video/audio files.

10. The method of transmitting data invoking a crippled file on a storage medium containing video and/or audio data over the Internet, according to claim 7, wherein said steps (c) and (d) are carried out substantially simultaneously so that said step (e) plays back the video and/or audio data substantially immediately after said step (d).

11. The method of transmitting data invoking a crippled file on a storage medium containing video and/or audio over the Internet, according to claim 7, wherein said storage medium comprises memory means for representing the necessary information for automatically and directly connecting via the Internet the end-user's computer, said method further comprising before said step (a), automatically and directly connecting the end user's computer to the host computer which has stored thereat the uncrippling trigger data for the video/audio files on the storage medium by means of the memory means of the storage medium for representing the necessary information for automatically and directly connecting via the Internet.

12. The method of transmitting data invoking a crippled file on a storage medium containing video and/or audio over the Internet, according to claim 7, wherein said step (a) comprises storing at least one of the following: Video/audio header data; data for removing the hidden-status flag for the video/audio data files on the storage medium; data for unzipping the zipped data files of the video/audio data files on storage medium; data for changing the extension of the video/audio data files.

13. The method of transmitting data invoking a crippled file on a storage medium containing video and/or audio over the Internet, according to claim 7, wherein said storage medium comprises at least one of: CD-ROM, floppy disk, and hard drive.

14. The method of transmitting data invoking a crippled file on a storage medium containing video and/or audio over the Internet, according to claim 8, further comprising permanently storing the incoming uncrippling trigger data in ROM of the end-user's computer, for repeatedly uncrippling the crippled file when the playing thereof is required.

15. In a storage device, for use with a computer, which storage device comprises memory means for storing digital data thereon, the improvement comprising:

said memory means comprising crippled data files representative of video and/or audio;

an end-user's computer for use in playing back the crippled data files on the storage device;

a host computer having a memory means for storing uncrippling data comprising selected data thereon for said crippled data files on said storage device;

a network system which is independent of platform system for linking said end-user's computer with said host computer, whereupon said host computer's sending said uncrippling data stored in said memory means thereof to said end-user's computer, said crippled data files on said storage device, associated with said end-user's computer is uncrippled in the RAM of the end-users's computer and rendered playable;

volatile memory means for receiving said uncrippling triggering data; means for immediately joining said uncrippling triggering data and said data files of said storage device in said RAM, for immediate playback of said data files;

said end-user's computer further comprising player means for playing back the uncrippled data files;

said means for immediately joining said uncrippling triggering data and said data files of said storage device, for immediate playback of said data files comprising means for preventing the copying of said uncrippling triggering data sent from said host computer to non-volatile memory.

16. The storage device for use with a computer according to claim 15, said wherein said storage device comprises CD-ROM means.

* * * * *

UNITED STATES PATENT AND TRADEMARK OFFICE
CERTIFICATE OF CORRECTION

| | |
|---|---|
| PATENT NO. | : 5,937,164 |
| APPLICATION NO. | : 08/792092 |
| DATED | : August 10, 1999 |
| INVENTOR(S) | : Kenneth G. Mages et al. |

It is certified that error appears in the above-identified patent and that said Letters Patent is hereby corrected as shown below:

In column 3, line 13, delete "an" and insert -- can --, therefor.

In column 3, line 19, delete "an" and insert -- can --, therefor.

In column 7, line 44, delete "scuh" and insert -- such --, therefor.

In column 7, line 45, delete "directroy," and insert -- directory, --, therefor.

In column 8, line 34, delete "Referrng" and insert -- Referring --, therefor.

In column 9-10, lines 12-13, delete "$value = ~tr/+//; $value = ~s/%([a-fA-FO-9][a-fA-FO-9])/pack("C",hex($1))/eg;" and insert -- "$value = ~tr/+//; $value = ~s/%([a-fA-FO-9][a-fA-FO-9])/pack("C",hex($1))/eg;" --, therefor.

In column 9-10, line 46, delete "pring" and insert -- print --, therefor.

In column 9-10, line 48, delete "pring" and insert -- print --, therefor.

In column 9-10, line 54, delete "texxt" and insert -- text --, therefor.

In column 9-10, line 54, delete "/htm1" and insert -- /html --, therefor.

In column 9-10, line 59, delete "DISCHARDABLE" and insert -- DISCARDABLE --, therefor.

In column 11-12, line 7, delete ""C&lean" and insert -- "&Clean --, therefor.

In column 11-12, line 31, delete ""C&opyrights"" and insert -- "&Copyrights" --, therefor.

In column 11-12, line 33, delete ""O&rdering" and insert -- "&Ordering --, therefor.

Signed and Sealed this
Fifteenth Day of November, 2011

David J. Kappos
*Director of the United States Patent and Trademark Office*

CERTIFICATE OF CORRECTION (continued)
U.S. Pat. No. 5,937,164

In column 11-12, line 40, delete ""E&xit" and insert -- "&Exit --, therefor.

In column 11-12, line 53, delete ""C&lean" and insert -- "&Clean --, therefor.

In column 11-12, line 77, delete ""C&opyrights"" and insert -- "&Copyrights" --, therefor.

In column 11-12, line 79, delete ""O&rdering" and insert -- "&Ordering --, therefor.

In column 13-14, line 7, delete ""E&xit" and insert -- "&Exit --, therefor.

In column 13-14, line 20, delete ""C&lean" and insert -- "&Clean --, therefor.

In column 13-14, line 23, delete ""Hide" and insert -- "&Hide --, therefor.

In column 13-14, line 44, delete ""C&opyrights"" and insert -- "&Copyrights" --, therefor.

In column 13-14, line 46, delete ""O&rdering" and insert -- "&Ordering --, therefor.

In column 13-14, line 53, delete ""E&xit" and insert -- "&Exit --, therefor.

In column 13-14, line 77, delete "BS-" and insert -- BS_ --, therefor.

In column 15-16, line 23, delete ""D&8rectories" and insert -- "&Directories --, therefor.

In column 15-16, line 41, delete "EDITEXT" and insert -- EDITTEXT --, therefor.

In column 15-16, line 53, after "WS_POPUP" insert -- | --.

In column 15-16, line 56, delete "EDITEXT" and insert -- EDITTEXT --, therefor.

In column 15-16, line 69, delete "BS-" and insert -- BS_ --, therefor.

In column 18, line 67, in Claim 12, delete "Video/audio" and insert -- video/audio --, therefor.

In column 20, line 8, in Claim 15, delete "users's" and insert -- user's --, therefor.

In column 20, line 24, in Claim 16, after "claim 15," delete "said".